(12) United States Patent
Tyercha et al.

(10) Patent No.: US 11,042,568 B2
(45) Date of Patent: *Jun. 22, 2021

(54) PROXY VIEWS FOR EXTENDED MONITORING OF DATABASE SYSTEMS

(71) Applicant: SAP SE, Walldorf (DE)

(72) Inventors: Edward-Robert Tyercha, Heidelberg (DE); Thomas Simenec, Berlin (DE); Thomas Koetter, Berlin (DE); Reiner Singer, Schriesheim (DE)

(73) Assignee: SAP SE, Walldorf (DE)

( * ) Notice: Subject to any disclaimer, the term of this patent is extended or adjusted under 35 U.S.C. 154(b) by 39 days.

This patent is subject to a terminal disclaimer.

(21) Appl. No.: 16/457,170

(22) Filed: Jun. 28, 2019

(65) Prior Publication Data

US 2019/0324974 A1  Oct. 24, 2019

Related U.S. Application Data

(63) Continuation of application No. 15/362,485, filed on Nov. 28, 2016, now Pat. No. 10,380,142.

(51) Int. Cl.
  *G06F 16/27* (2019.01)
  *H04L 12/26* (2006.01)
  *H04L 29/08* (2006.01)

(52) U.S. Cl.
  CPC ......... *G06F 16/275* (2019.01); *H04L 43/028* (2013.01); *H04L 43/045* (2013.01); *H04L 43/0876* (2013.01); *H04L 67/1097* (2013.01); *H04L 67/2819* (2013.01); *H04L 67/1004* (2013.01); *H04L 67/1095* (2013.01); *H04L 67/32* (2013.01)

(58) Field of Classification Search
  CPC ... G06F 16/275; G06F 16/27; H04L 67/1097; H04L 43/028; H04L 43/045; H04L 43/0876; H04L 67/2819; H04L 67/1095; H04L 67/32; H04L 67/1004
  See application file for complete search history.

(56) References Cited

U.S. PATENT DOCUMENTS

6,473,750 B1  10/2002  Petculescu
6,789,071 B1  9/2004  Kapoor
(Continued)

*Primary Examiner* — Jorge A Casanova
(74) *Attorney, Agent, or Firm* — Klarquist Sparkman, LLP (57) ABSTRACT

A computer implemented method for monitoring databases includes providing views for monitoring information associated with a first datacenter and proxy views for monitoring information associated with a second datacenter. The first datacenter receives a query for monitoring information and parses the query to identify filter information that identifies which of the first or second datacenter the requested services are running on. If the filter information indicates the service is running on the first datacenter, the first datacenter queries the views to request the monitoring information from the server on the first datacenter running the requested service. If the filter information indicates the service is running on the second datacenter, the first datacenter queries the proxy views to request the monitoring information from the server on the second datacenter running the requested service, and receives the monitoring information. Related apparatus, systems, techniques and articles are also described.

18 Claims, 5 Drawing Sheets

(56) References Cited

U.S. PATENT DOCUMENTS

| | | | |
|---|---|---|---|
| 6,922,724 B1* | 7/2005 | Freeman | G06F 9/505 |
| | | | 709/223 |
| 2003/0050980 A1* | 3/2003 | Dutta | H04L 29/06 |
| | | | 709/205 |
| 2005/0131893 A1 | 6/2005 | Von Glan | |
| 2007/0136274 A1 | 6/2007 | Takuma | |
| 2009/0234805 A1 | 9/2009 | Golwalkar | |
| 2012/0197934 A1* | 8/2012 | Zhang | G06F 16/24568 |
| | | | 707/770 |
| 2014/0122452 A1 | 5/2014 | Faerber | |
| 2015/0019516 A1 | 1/2015 | Wein | |
| 2015/0269224 A1 | 9/2015 | Kundu | |
| 2016/0182298 A1 | 6/2016 | Brooks | |
| 2016/0196131 A1 | 7/2016 | Searle | |
| 2017/0085447 A1 | 3/2017 | Chen | |
| 2017/0124220 A1 | 5/2017 | Krueger | |

* cited by examiner

PROXY VIEWS FOR EXTENDED MONITORING OF DATABASE SYSTEMS

CROSS REFERENCE TO RELATED APPLICATIONS

This application is a continuation under 35 U.S.C. § 120 of U.S. patent application Ser. No. 15/362,485, filed Nov. 28, 2016. The foregoing related application, in its entirety, is incorporated herein by reference.

TECHNICAL FIELD

The subject matter described herein relates to monitoring database systems and to the use of proxy views to enable a datacenter to provide monitoring information from another datacenter.

BACKGROUND

Databases rely on data replication and synchronization to maintain continuous system availability. Typically, in such a system, a complete copy of the database is stored at a first datacenter and the same complete copy of the database is stored at a second datacenter. The first and second datacenters may be in different locations. Since the data in the second datacenter needs to be the same as the data in the first datacenter, a synchronization mechanism is typically employed to handle synchronization of the data. If there is a failure associated with the first datacenter, the system can switch to using the second datacenter without significant issues.

Since the second datacenter may be asked to perform all of the same tasks as the first datacenter, typically, the second datacenter has the same hardware and software requirements as the first datacenter. Sometimes more than two datacenters may be included within a database.

SUMMARY

In some aspects, monitoring databases includes providing, at a first datacenter, views for monitoring information associated with a first datacenter and proxy views for monitoring information associated with a second datacenter. The first datacenter receives a query for monitoring information associated with services running on the first datacenter and/or the second datacenter. The first datacenter parses the query to identify filter information that identifies which of the first or second datacenter the requested services are running on. The datacenters may be part of the same database and the database may be an in memory database (IMDB) and/or a column oriented database.

If the filter information indicates the service is running on the first datacenter, the first datacenter queries the views to request the monitoring information from the server on the first datacenter running the requested service. If the filter information indicates the service is running on the second datacenter, the first datacenter queries the proxy views to request the monitoring information from the server on the second datacenter running the requested service, and receives the monitoring information. Related apparatus, systems, techniques and articles are also described.

In some aspects, alerting based at least in part on the views and proxy views may be provided. Additionally, the connection status between the first datacenter and the second datacenter may be monitored and the proxy views may be skipped upon detection that the second datacenter is no longer connected to the first datacenter.

In some aspects, a server that can securely communicate with another datacenter (e.g., a name server) within the first datacenter may communicate with a server capable of securely communicating with another datacenter (e.g., a name server) within the second datacenter over a secure connection to obtain the monitoring information from the appropriate server running the requested service on the second datacenter.

In some aspects, the name server within the first datacenter may receive the request for monitoring information associated with the second datacenter from another server (e.g., the index server) in the first datacenter.

In some aspects the first datacenter is in an active mode and the second datacenter is in an active mode to enable distribution of the workload between the first datacenter and the second datacenter. The second datacenter may be in a read-only mode.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods may be implemented by one or more data processors either within a single computing system or distributed among two or more computing systems. Such computing systems may be connected and may exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the proxy monitoring described herein may facilitate the ability to simultaneously utilize multiple datacenters (e.g., a first and a second datacenter). The proxy monitoring may enable multiple datacenters within a database to share certain statistics and monitoring information. The extended monitoring may also facilitate better utilization of hardware (e.g., processors and memory) associated with the database system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

A database or database system may be represented as a table or a set of tables, the tables containing data in rows and/or columns. In a row based database, data in a table may be stored and organized by rows. Alternatively, data in a table may also be stored and organized by columns and such a database is called a column oriented database or a columnar database. Column oriented databases typically make more efficient use of storage by replacing redundant data with a pointer. One example of a database system is SAP HANA®. SAP HANA® is a column oriented relational database system. SAP HANA® is also an in memory database (IMDB) in which the data associated with the database is stored in main memory instead of disk storage so it may be accessed more quickly. IMDB systems are generally column oriented databases since column oriented databases make more efficient use of the expensive main memory Some databases may utilize replication to improve reliability and availability of the database. If data replication is implemented, the database system may include a first datacenter and a second datacenter. The first datacenter may include a processor and memory sufficient to store the data associated with the database. The first datacenter may store a first (primary) copy of the data associated with the database. The second datacenter may also include a processor and memory sufficient to store the data associated with the database. The second datacenter may store a second (backup) copy of the data associated with the database. In some implementations, the database may include more than two datacenters (e.g., three or four datacenters)

To better utilize the second (and subsequent) datacenter, some database systems, such as SAP HANA®, may simultaneously utilize the first datacenter and the second datacenter. In this mode of operation, the first datacenter may be configured to delegate queries to the second datacenter to balance the load between the two systems. Such a situation may be referred to as Active/Active (AA) operation since the first datacenter and the second datacenter both actively respond to queries at the same time.

Database monitoring is desirable so an administrator or user is aware of the current state or health of the database and is able to obtain historical statistics about the database and its health. If multiple datacenters are available for use (whether active or not), it may be desirable to monitor the datacenters to obtain monitoring information related to the datacenters. Monitoring information may include, for example, table sizes, CPU usage, memory usage, etc. Additionally, since the first datacenter delegates queries to the second datacenter in an active/active operation, it may be desirable for the first datacenter to obtain the monitoring information from the other datacenter.

Figure 1:
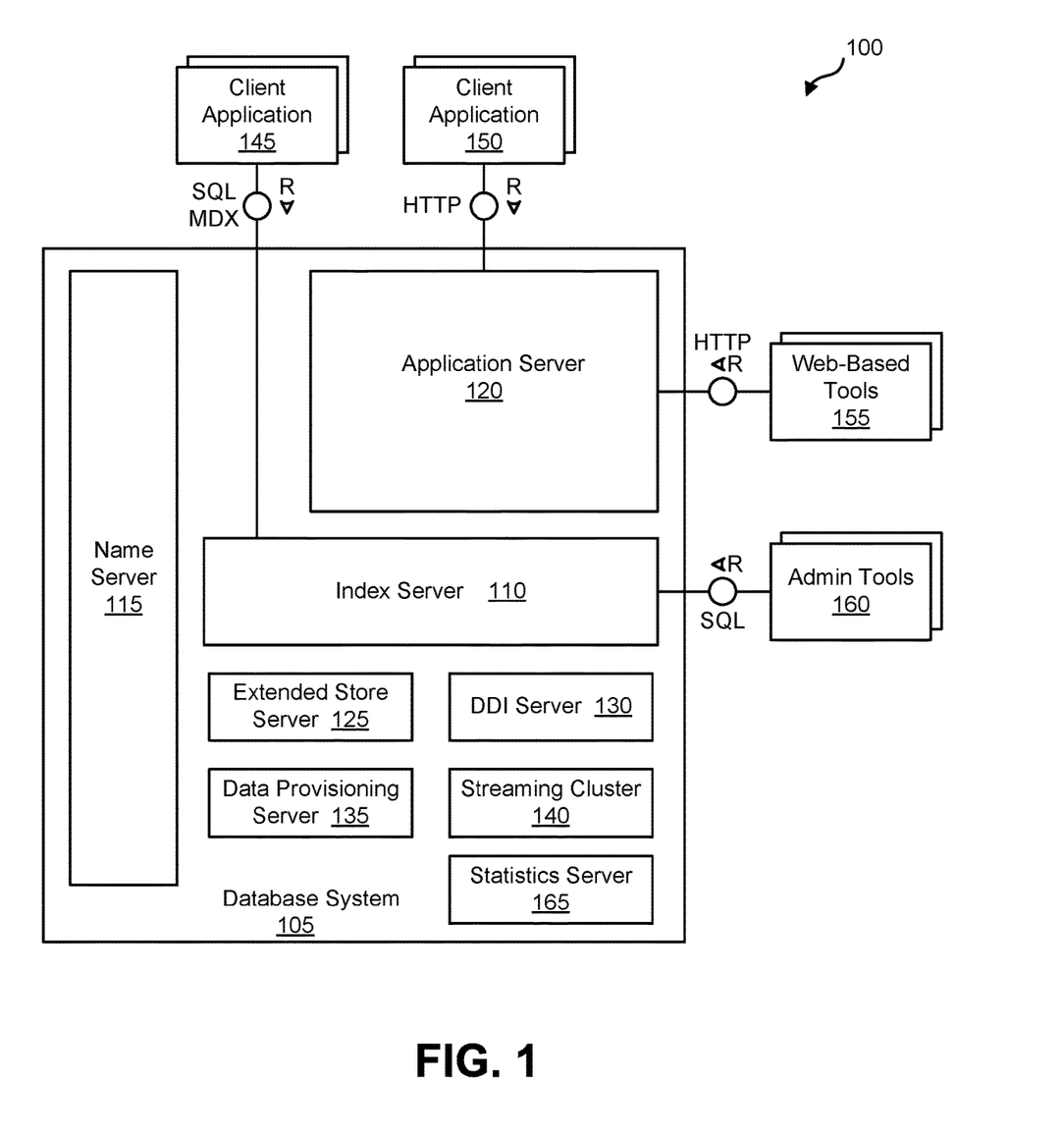
FIG. 1 is a system diagram illustrating an example database system for use in connection with the current subject matter.

FIG. 1 is a diagram 100 illustrating a database system 105 that may be used to implement aspects of the current subject matter. The database system 105 may, for example, be an in-memory database in which all relevant data is kept in main memory so that read operations may be executed without disk I/O operations which are required by disk storage to make any changes durable. The database system 105 may include a plurality of servers including, for example, one or more of an index server 110, a name server 115, and/or an application server 120. The database system 105 may also include one or more of an extended store server 125, a database deployment infrastructure (DDI) server 130, a data provisioning server 135, a streaming cluster 140, and/or a statistics server 165. The database system 105 may be accessed by a plurality of remote clients 145, 150 via different protocols such as SQL/MDX (e.g., by way of the index server 110) and/or web-based protocols such as HTTP (e.g., by way of the application server 120).

The index server 110 may contain in-memory data stores and engines for processing data. The index server 110 may also be accessed by remote tools (via, for example, SQL queries), that may provide various development environment and administration tools. Additional details regarding an example implementation of the index server 110 are described and illustrated in connection with diagram 300 of FIG. 3.

The name server 115 may own information about the topology of the database system 105. In a distributed database system, the name server 115 may know where various components are running and which data is located on which server. In a database system 105 with multiple database containers, the name server 115 may have information about existing database containers and it may also host the system database. For example, the name server 115 may manage the information about existing tenant databases. Unlike a name server 115 in a single-container system, the name server 115 in a database system 105 having multiple database containers may not store topology information such as the location of tables in a distributed database. In a multi-container database system 105 such database-level topology information may be stored as part of the catalogs of the tenant databases.

The application server 120 may enable native web applications used by one or more remote clients 150 accessing the database system 105 via a web protocol such as HTTP. The application server 120 may allow developers to write and run various database applications without the need to run an additional application server. The application server 120 may also be used to run web-based tools 155 for administration, life-cycle management, and development. Other administration and development tools 160 may directly access the index server 110, for example, via SQL and other protocols.

The extended store server 125 may be part of a dynamic tiering option that may include a high-performance disk-based column store for very big data up to the petabyte range and beyond. Less frequently accessed data (for which is it non-optimal to maintain in main memory of the index server 110) may be put into the extended store server 125. The dynamic tiering of the extended store server 125 allows for hosting of very large databases with a reduced cost of ownership as compared to conventional arrangements.

The DDI server 130 may be a separate server process that is part of a database deployment infrastructure (DDI). The DDI may be a layer of the database system 105 that simplifies the deployment of database objects using declarative design time artifacts. DDI may ensure a consistent deployment, for example, by guaranteeing that multiple objects are deployed in the right sequence based on dependencies, and by implementing a transactional all-or-nothing deployment.

The data provisioning server 135 may provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (e.g., data feeds, etc.) to be utilized by the database system 105. The streaming cluster 140 allows for both consumption of data streams and for complex event processing.

The statistics server 165 enables internal monitoring of the database system 105. The statistics server 165 may notify or alert an administrator when critical situations arise and may provide historical monitoring data as well. In some embodiments, the statistics server 165 may be part of the index server 110 or some other server within database system 105.

Figure 2:
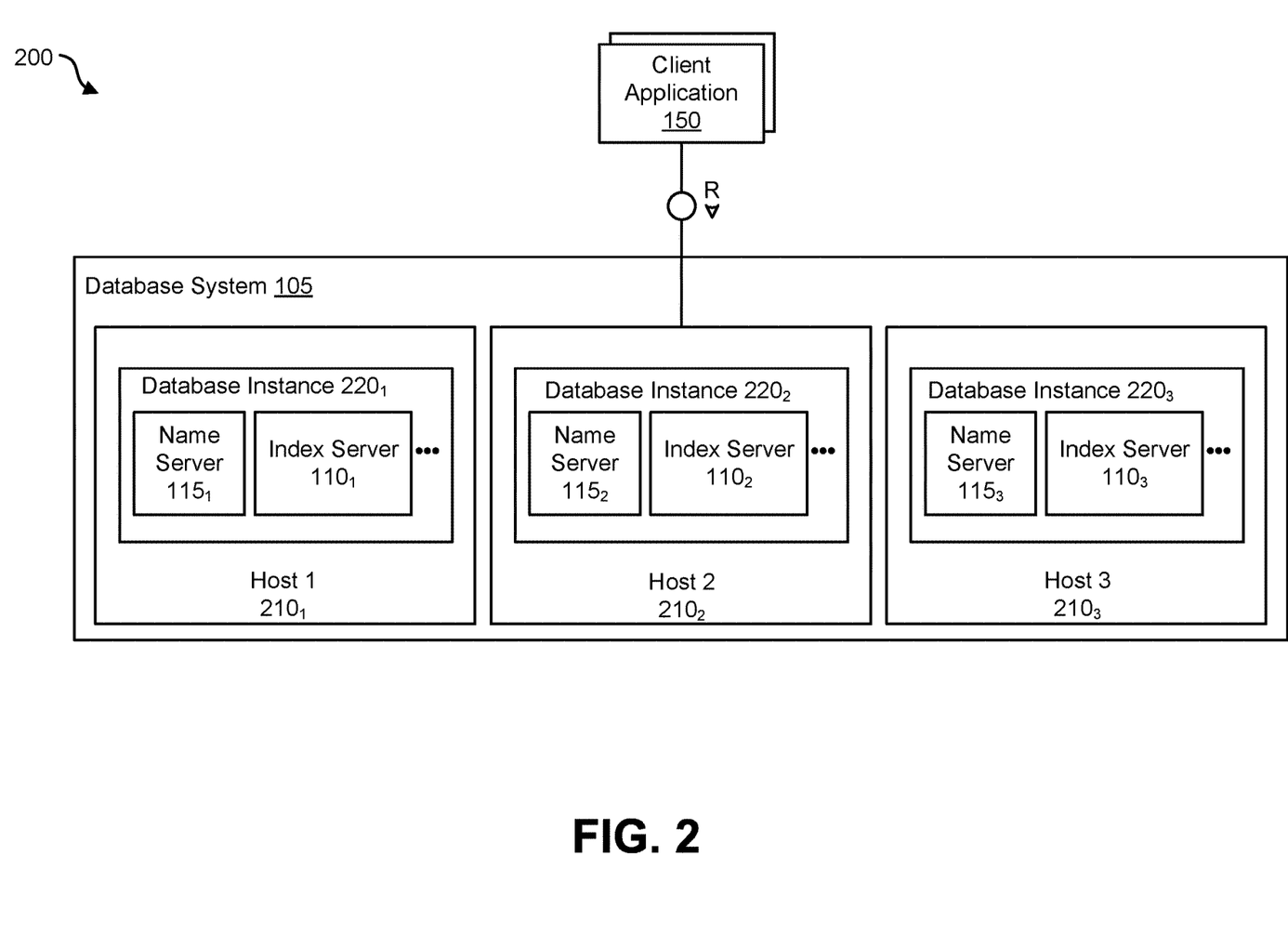
FIG. 2 is a system diagram illustrating a distributed database system having a plurality of database instances.

FIG. 2 is a diagram 200 illustrating a variation of the database system 105 that may support distribution of server components across multiple hosts for scalability and/or availability purposes. This database system 105 may, for example, be identified by a single system ID (SID) and it may be perceived as one unit from the perspective of an administrator, who may install, update, start up, shut down, or backup the system as a whole. The different components of the database system 105 may share the same metadata, and requests from client applications 150 may be transparently dispatched to different servers $110_{1-3}$, $120_{1-3}$, in the system, if required.

As is illustrated in FIG. 2, the distributed database system 105 may be installed on more than one host $210_{1-3}$. Each host $210_{1-3}$ is a machine that may comprise at least one data processor (e.g., a CPU, etc.), memory, storage, a network interface, and an operation system and which executes part of the database system 105. Each host $210_{1-3}$ may execute a database instance $220_{1-3}$ which comprises the set of components of the distributed database system 105 that are installed on one host $210_{1-3}$. FIG. 2 shows a distributed system with three hosts, which each run a name server $115_{1-3}$, index server $110_{1-3}$, and so on (other components are omitted to simplify the illustration).

Figure 3:
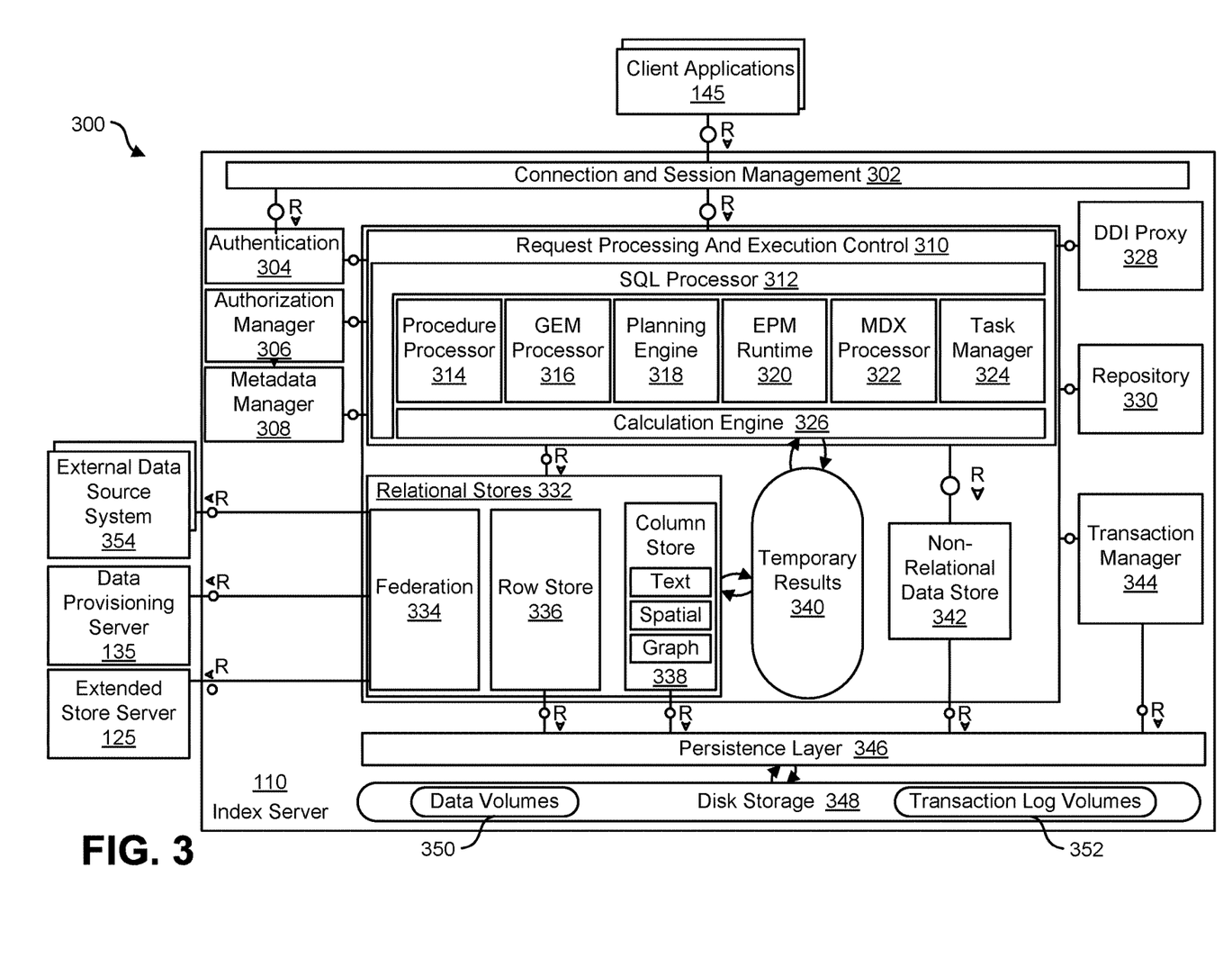
FIG. 3 is a system diagram of an index server forming part of the database system of FIG. 1.

FIG. 3 is a diagram 300 illustrating an architecture for the index server 110 (which may, as indicated above, be one of many instances). A connection and session management component 302 may create and manage sessions and connections for the client applications 145. For each session, a set of parameters may be maintained such as, for example, auto commit settings or the current transaction isolation level.

Requests from the client applications 145 may be processed and executed by way of a request processing and execution control component 310. The database system 105 offers rich programming capabilities for running application-specific calculations inside the database system. In addition to SQL, MDX, and WIPE, the database system 105 may provide different programming languages for different use cases. SQLScript may be used to write database procedures and user defined functions that may be used in SQL statements. L language may be used to implement operator logic that may be called by SQLScript procedures and for writing user-defined functions.

Once a session is established, client applications 145 typically use SQL statements to communicate with the index server 110 which may be handled by a SQL processor 312 within the request processing and execution control component 310. Analytical applications may use the multidimensional query language MDX (MultiDimensional eXpressions) via an MDX processor 322. For graph data, applications may use GEM (Graph Query and Manipulation) via a GEM processor 316, a graph query and manipulation language. SQL statements and MDX queries may be sent over the same connection with the client application 145 using the same network communication protocol. GEM statements may be sent using a built-in SQL system procedure.

The index server 110 may include an authentication component 304 that may be invoked when a new connection with a client application 145 is established. Users may be authenticated either by the database system 105 itself (login with user and password) or authentication may be delegated to an external authentication provider. An authorization manager 306 may be invoked by other components of the database system 105 to check whether the user has the required privileges to execute the requested operations.

Statements may be processed in the context of a transaction. New sessions may be implicitly assigned to a new transaction. The index server 110 may include a transaction manager 344 that coordinates transactions, controls transactional isolation, and keeps track of running and closed transactions. When a transaction is committed or rolled back, the transaction manager 344 may inform the involved engines about this event so they may execute necessary actions. The transaction manager 344 may provide various types of concurrency control and it may cooperate with a persistence layer 346 to achieve atomic and durable transactions.

Incoming SQL requests from the client applications 145 may be received by the SQL processor 312. Data manipulation statements may be executed by the SQL processor 312 itself. Other types of requests may be delegated to the respective components. Data definition statements may be dispatched to a metadata manager 306, transaction control statements may be forwarded to the transaction manager 344, planning commands may be routed to a planning engine 318, and task related commands may forwarded to a task manager 324 (which may be part of a larger task framework). Incoming MDX requests may be delegated to the MDX processor 322. Procedure calls may be forwarded to the procedure processor 314, which further dispatches the calls, for example to a calculation engine 326, the GEM processor 316, a repository 300, or a DDI proxy 328.

The index server 110 may also include a planning engine 318 that allows planning applications, for instance for financial planning, to execute basic planning operations in the database layer. One such basic operation is to create a new version of a data set as a copy of an existing one while applying filters and transformations. For example, planning data for a new year may be created as a copy of the data from the previous year. Another example for a planning operation is the disaggregation operation that distributes target values from higher to lower aggregation levels based on a distribution function.

The SQL processor 312 may include an enterprise performance management (EPM) runtime component 320 that may form part of a larger platform providing an infrastructure for developing and running enterprise performance management applications on the database system 105. While the planning engine 318 may provide basic planning operations, the EPM platform provides a foundation for complete planning applications, based on application-specific planning models managed in the database system 105.

The calculation engine 326 may provide a common infrastructure that implements various features such as SQLScript, MDX, GEM, tasks, and planning operations. The SQLScript processor 312, the MDX processor 322, the planning engine 318, the task manager 324, and the GEM processor 316 may translate the different programming languages, query languages, and models into a common representation that is optimized and executed by the calculation engine 326. The calculation engine 326 may implement those features using temporary results 340 which may be based, in part, on data within the relational stores 332.

Metadata may be accessed via the metadata manager component 308. Metadata, in this context, may comprise a variety of objects, such as definitions of relational tables, columns, views, indexes and procedures. Metadata of all these types may be stored in one common database catalog for all stores. The database catalog may be stored in tables in a row store 336 forming part of a group of relational stores 332. Other aspects of the database system 105 including, for example, support and multi-version concurrency control may also be used for metadata management. In distributed systems, central metadata may be shared across servers and the metadata manager 308 may coordinate or otherwise manage such sharing.

The relational stores 332 form the different data management components of the index server 110 and these relational stores may, for example, store data in main memory. The row store 336, a column store 338, and a federation component 334 are all relational data stores which may provide access to data organized in relational tables. The column store 338 may store relational tables column-wise (i.e., in a column-oriented fashion, etc.). The column store 338 may also comprise text search and analysis capabilities, support for spatial data, and operators and storage for graph-structured data. With regard to graph-structured data, from an application viewpoint, the column store 338 may be viewed as a non-relational and schema-flexible in-memory data store for graph-structured data. However, technically such a graph store is not a separate physical data store. Instead it is built using the column store 338, which may have a dedicated graph API.

The row store 336 may store relational tables row-wise. When a table is created, the creator may specify whether it should be row or column-based. Tables may be migrated between the two storage formats. While certain SQL extensions are only available for one kind of table (such as the "merge" command for column tables), standard SQL may be used on all tables. The index server 110 also provides functionality to combine both kinds of tables in one statement (join, sub query, union).

The federation component 334 may be viewed as a virtual relational data store. The federation component 334 may provide access to remote data in external data source system(s) 354 through virtual tables, which may be used in SQL queries in a fashion similar to normal tables.

The database system 105 may include an integration of a non-relational data store 342 into the index server 110. For example, the non-relational data store 342 may have data represented as networks of C++ objects, which may be persisted to disk. The non-relational data store 342 may be used, for example, for optimization and planning tasks that operate on large networks of data objects, for example in supply chain management. Unlike the row store 336 and the column store 338, the non-relational data store 342 does not use relational tables; rather, objects may be directly stored in containers provided by the persistence layer 346. Fixed size entry containers may be used to store objects of one class. Persisted objects may be loaded via their persisted object IDs, which may also be used to persist references between objects. In addition, access via in-memory indexes is supported. In that case, the objects need to contain search keys. The in-memory search index is created on first access. The non-relational data store 342 may be integrated with the transaction manager 344 to extend transaction management with sub-transactions, and to also provide a different locking protocol and implementation of multi version concurrency control.

An extended store is another relational store that may be used or otherwise form part of the database system 105. The extended store may, for example, be a disk-based column store optimized for managing very big tables, which may not be desirable to keep in memory (as with the relational stores 332). The extended store may run in an extended store server 125 separate from the index server 110. The index server 110 may use the federation component 334 to send SQL statements to the extended store server 125.

The persistence layer 346 is responsible for durability and atomicity of transactions. The persistence layer 346 may ensure that the database system 105 is restored to the most recent committed state after a restart and that transactions are either completely executed or completely undone. To achieve this goal in an efficient way, the persistence layer 346 may use a combination of write-ahead logs, shadow paging and savepoints. The persistence layer 346 may provide interfaces for writing and reading persisted data and it may also contain a logger component that manages a transaction log. Transaction log entries may be written explicitly by using a log interface or implicitly when using the virtual file abstraction.

The persistence layer 346 stores data in persistent disk storage 348 which, in turn, may include data volumes 350 and/or transaction log volumes 352 that may be organized in pages. Different page sizes may be supported, for example, between 4 k and 16 M. Data may be loaded from the disk storage 348 and stored to disk page wise. For read and write access, pages may be loaded into a page buffer in memory. The page buffer need not have a minimum or maximum size, rather, all free memory not used for other things may be used for the page buffer. If the memory is needed elsewhere, least recently used pages may be removed from the cache. If a modified page is chosen to be removed, the page first needs to be persisted to disk storage 348. While the pages and the page buffer are managed by the persistence layer 346, the in-memory stores (i.e., the relational stores 332) may access data within loaded pages.

Figure 4:
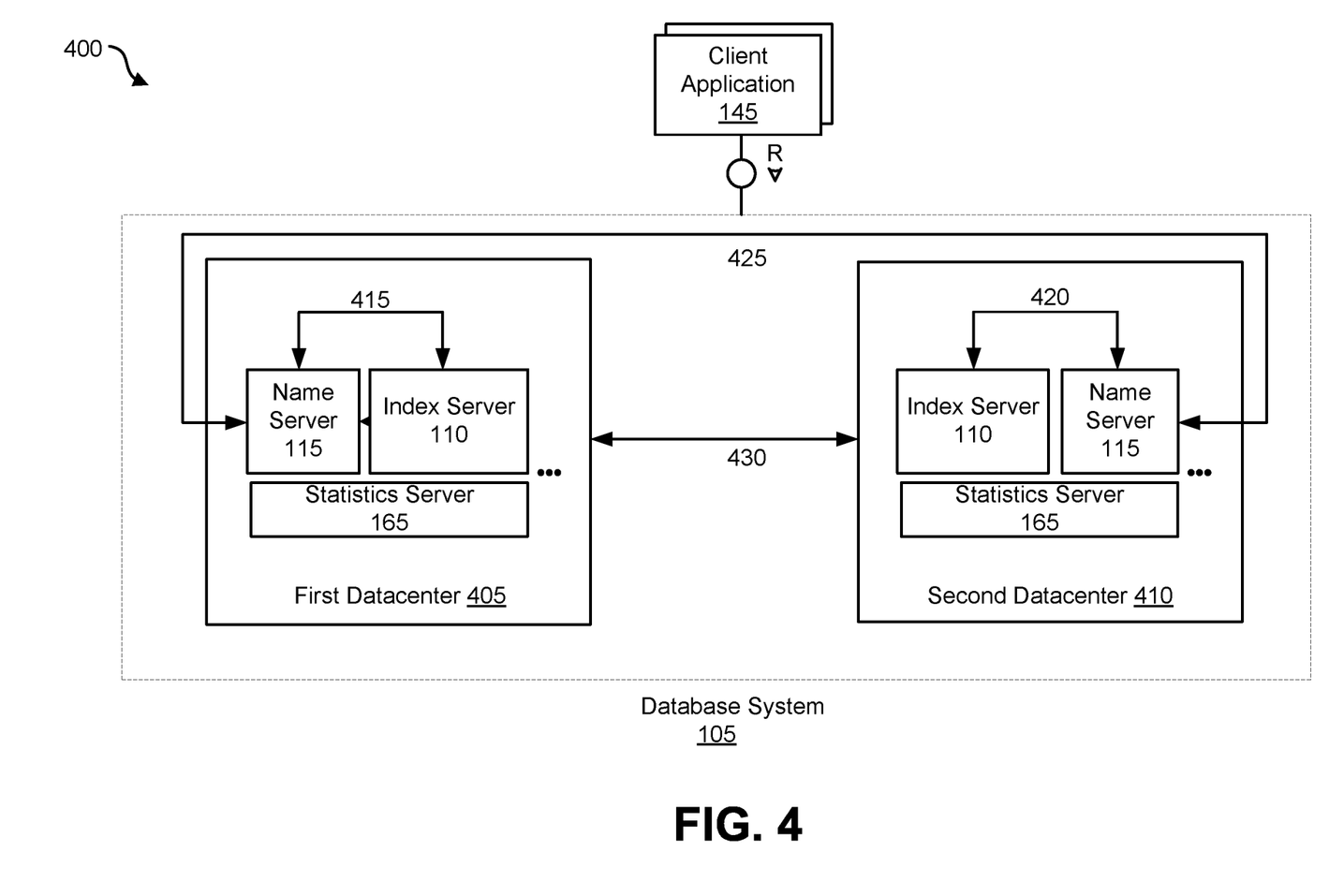
FIG. 4 is a system diagram illustrating a database system that includes a first and a second datacenter.

FIG. 4 is a system diagram 400 illustrating a database system that includes a first and a second datacenter. In system 400, database system 105 includes a first datacenter 405 and a second datacenter 410. The second datacenter 410 may be a backup for first datacenter 105 that includes an identical copy of the data stored in first datacenter 405. Although only two datacenters are illustrated, additional datacenters may also be present.

This structure 400 is distinguished from the structure 200 illustrated in FIG. 2 since these are not multiple instances of a single database that are seen as a single entity but rather two separate datacenters where one is a backup (or replicated copy) of the other.

The second datacenter 410 may be a complete copy of the first datacenter 405. For example, the two datacenters may include the same data as mentioned above, but in some embodiments, the second datacenter 410 may also include the same memory and processor resources as the first datacenter 405. Since the second datacenter 410 may be asked to perform all of the same tasks as the first datacenter 105 if the first datacenter 405 fails, typically, the second datacenter has the same hardware and software requirements as the first datacenter. Accordingly, the first datacenter 405 and the second datacenter 410 may both include a name server 115, an index server 110, a statistics server 165, and any additional servers that may be desirable (e.g., any of the various servers and other components illustrated in FIG. 1 and FIG. 3). In some embodiments, the datacenters may be in different geographic locations.

In embodiments where the data in the second datacenter 410 needs to be the same as the data in the first datacenter 405, a synchronization mechanism may be employed to handle synchronization of the data. In this manner, if there is a failure associated with the first datacenter 405, the system 400 can switch to using the second datacenter 410 without significant issues. In fact, in some embodiments, the switchover may be completely transparent to the user. To facilitate effective and reliable synchronization, in some embodiments, the second datacenter 410 may be a read-only copy of the first datacenter 405. This read-only structure may enable more reliable replication since data will only need to be replicated/synchronized in one direction—from the first datacenter 405 to the second datacenter 410. Two-way synchronization may be more complex, more cumbersome, and/or more prone to errors.

In some embodiments, an idle second datacenter 410 may not be desirable since the cost of maintaining it, relative to its usage, may be significant. Accordingly, as discussed above, to better utilize the second datacenter, some database systems, such as SAP HANA®, may simultaneously utilize the first datacenter 405 and the second datacenter 410 to respond to queries. In this mode of operation, the first datacenter may be configured to delegate queries to the second datacenter to balance the load between the two systems. Such a situation may be referred to as Active/Active (AA) operation since the first datacenter 405 and the second datacenter 410 both actively respond to queries.

Although an active/active operation is beneficial, the main purpose of the second datacenter 410 may still be as a backup to the first datacenter 405. That is, the benefits of an active/active mode of operation should not compromise the reliability of the replication system. Accordingly, in some embodiments, it may be desirable to maintain certain restrictions on the second datacenter 410. For example, even though the second datacenter 410 is actively responding to queries, client applications 145 may not be permitted to directly access the second datacenter 410 since the second datacenter 410 is maintained as read-only.

Accordingly, in operation, when a user makes a query (e.g., an SQL query), it may be sent to the first datacenter 405 which is configured for bi-directional communication with the client applications 145. The first datacenter 405 may respond to the query or the first datacenter 405 may delegate the query to the second datacenter 410 via communication 430 and the second datacenter 410 may respond to the client application 145. The response to the client application 145 may be via a uni-directional communication.

Regardless of whether the database system 105 is in an active/active operation or the second datacenter is merely being used as a backup, monitoring the status of the database system may be desirable. Such monitoring may be done by the statistics server 165, which may be present in both datacenters, to obtain monitoring information related to its respective datacenter. As discussed above, monitoring information may include, for example, table sizes, CPU usage, memory usage, etc. Additionally, since the first datacenter 405 may be the "primary" datacenter (e.g., it delegates queries to the second datacenter 410), it may be desirable for the first datacenter 405 to obtain the monitoring information from both datacenters. For example, monitoring information from both datacenters may be utilized to assist with load balancing between the two datacenters in an active/active operation or to understand the current state of the second datacenter 410 in case there is a failure or similar event that requires use of the second datacenter 410.

Generally, it may be desirable to request monitoring information from one of the datacenters about other datacenters instead of querying different datacenters for their respective monitoring information. Accordingly, in operation, queries for the second datacenter 410 may also be received by the first datacenter 405 (e.g., the index server 110). In this manner, the first datacenter 405 acts like a proxy server for the second (and other) datacenters within the database 105. The query is a request to the database to obtain views associated with the database. The views include monitoring information associated with individual services running on different servers within the database. If the view is provided from a different datacenter, the view may be referred to as a proxy view. For example, in connection with FIG. 4, services may be running on the index server 110 in the first datacenter 405 and on the index server 110 and/or the statistics server 165 in the second datacenter 410. The query includes the capability to request views associated with one, some, or all of these services. In some embodiments, each of the services may include a unique address that the query uses to identify the desired service. The address may include a filter that determines whether the service is running on the first datacenter 405 or the second datacenter 410. The first datacenter 405 detects this filter and requests the relevant monitoring information from the relevant server in the correct datacenter.

In some embodiments, the server that receives the request may directly request the information from the relevant server. For example, the index server 110 in the first datacenter 405 may directly request monitoring information from the index server 110 in the second database 410. However, in some modes of operation, this direct communication may not be permitted. For example, in the case that the second datacenter 410 is a backup of the first datacenter 405, direct communication between the various servers may not be permitted (e.g., for security purposes). For example, in the SAP HANA© database system communications between datacenters may only be permitted via secure connection 425 between the name servers 115. In other implementations, the secure connection 425 may be between any servers capable of securely communicating with each other between datacenters. In these situations, the database system 105 may utilize the existing secure communication 425 between the name servers 115 in each of the datacenters. Accordingly, if a query is received by the index server 110 in the first datacenter 405 about monitoring information associated with a service running on the index server 110 on the second datacenter 410, the index server 110 in the first datacenter 405 may communicate the relevant portion of the query to the name server 115 in the first datacenter 405 via connection 415. The name server 115 in the first datacenter 405 may communicate with the name server 115 in the second datacenter 410 via secure connection 425 and the name server 115 in the second datacenter 410 may communicate with index server 110 in the second datacenter 405 via connection 420 to retrieve the requested monitoring information. The monitoring information may be returned to the first database 405 in the same but opposite manner.

As discussed above, the first datacenter 405 may act in a manner similar to a proxy server since it is an intermediately between the client request and the other datacenters and the views, which include monitoring information, returned by the second datacenter 410 may be referred to as proxy views. The monitoring information (e.g., views) from the first datacenter 405 and the monitoring information (e.g., proxy views) from the second datacenter 410 may be separately grouped into a schema (e.g., an SQL schema) on the first datacenter. In some embodiments, the schema (structure of the data) may be the same for both datacenters 405, 410. In some embodiments, the tables may be created dynamically. Queries may operate on the views and the proxy views to return the requested results. Additionally, alerting (e.g., automatic alerting) by the statistics server 165 in the first datacenter 405 may be provided to a system administrator based, at least in part, on the data in the views and the proxy views.

In some embodiments, if the second datacenter 410 is no longer connected to the first datacenter 405, the proxy views may be skipped or ignored and no data may be displayed for the second datacenter. If the second datacenter is disabled or removed (e.g., the connection is no longer needed) the proxy views may be deleted. Accordingly, in some embodiments, the first datacenter 405 may monitor the connection status between the first datacenter 405 and the second datacenter 410 and skip the proxy views if it detects that the second datacenter 410 is no longer connected to the first datacenter 405. In some embodiments, the proxy views may include monitoring information for a plurality of datacenters. For example, in some embodiments, the proxy views may include monitoring information for a second and a third datacenter.

Figure 5:
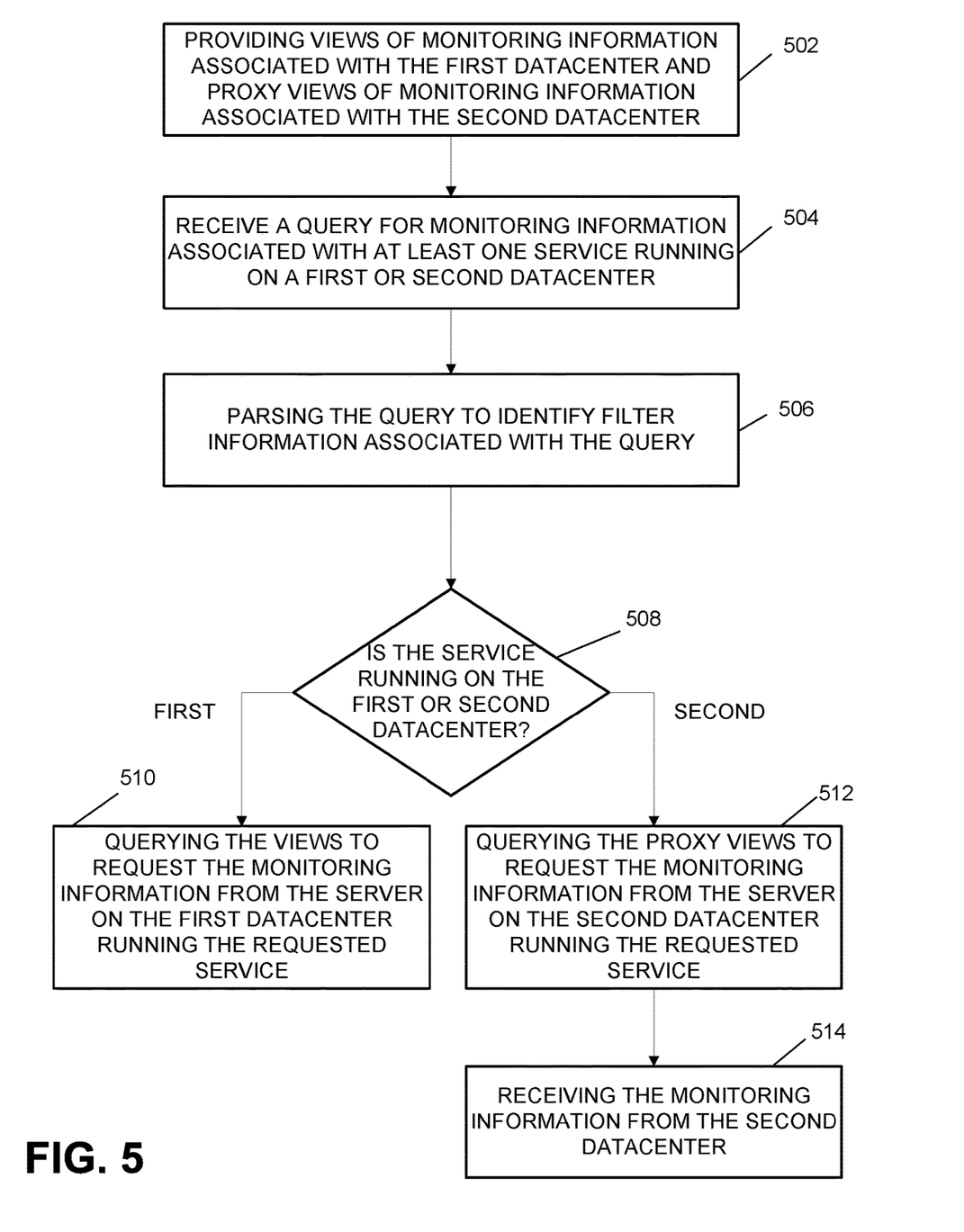
FIG. 5 is a flowchart illustrating an exemplary operation of a system for using proxy views to perform extended monitoring.

FIG. 5 is a flowchart illustrating an exemplary operation of a system for using proxy views to perform extended monitoring. In some embodiments, the method may be performed by the first datacenter 405. In operation 502, the first datacenter 405 provides view of monitoring information associated with the first datacenter 405 and proxy views of monitoring information associated with the second datacenter 410. In embodiments, the views have a first data structure schema. In some embodiments, the proxy views have a second data structure schema that may be the same as the first data structure schema. In operation 504, the first datacenter 405 receives a query for monitoring information associated with at least one service. The service may be running on the first datacenter 405 or the second datacenter 410. In operation 506, the query is parsed to identify filter information associated with the query. The filter information identifies, in part, which of the first datacenter or the second datacenter the requested service is running on. In operation 508, the first datacenter 405 determines whether the filter information indicates the service is running on the first datacenter 405 or the second datacenter 410. If the filter information indicates the service is running on the first datacenter, the first datacenter 405 queries the views to request, via a server within the first datacenter 405, the monitoring information from the server on the first datacenter 405 running the requested service at operation 510. Although not shown, in FIG. 5, the requested information is then provided to the requesting server for display to a user. If the filter information indicates the service is running on the second datacenter, the first datacenter queries the proxy views to request, via a server within the first datacenter 405, the monitoring information from the server on the second datacenter 410 running the requested service at operation 512, and receives the monitoring information at the first datacenter at operation 514. The requested information is then provided to the requesting server for display to a user.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together."

A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method comprising:
providing, at a first datacenter, at least one view for monitoring information associated with the first datacenter, and at least one proxy view for monitoring information associated with a second datacenter, the second datacenter being a backup for the first datacenter storing an identical copy of data stored on the first datacenter;
receiving, at the first datacenter, a query for monitoring information associated with at least one service running on the first datacenter or the second datacenter within a database; and
parsing, at the first datacenter, the query to identify filter information associated with the query, the filter information identifying which of the first datacenter or the second datacenter the requested service is running on.

2. The method of claim 1, further comprising:
querying the at least one view to request, by a server within the first datacenter, the monitoring information from the server on the first datacenter running the requested service.

3. The method of claim 1, further comprising:
querying the at least one proxy view to request, by a server within the first datacenter, the monitoring information from the server on the second datacenter running the requested service; and
receiving, at the first datacenter, the monitoring information from the second datacenter.

4. The method of claim 1, further comprising:
providing alerting based at least in part on the at least one view and the at least one proxy view.

5. The method of claim 1, further comprising:
monitoring the connection status between the first datacenter and the second datacenter; and
skipping the at least one proxy view upon detection that the second datacenter is no longer connected to the first datacenter.

6. The method of claim 1, wherein a server capable of secure communications with remote datacenters within the first datacenter communicates with a server capable of secure communications with remote datacenters within the second datacenter to obtain the monitoring information from the server on the second datacenter running the requested service.

7. A system comprising:
at least one processor; and
a non-transitory computer readable media having computer executable instructions stored therein, which, when executed by the processor, causes the system to perform operations comprising:
providing, at a first datacenter, at least one view for monitoring information associated with the first datacenter, and at least one proxy view for monitoring information associated with a second datacenter, the second datacenter being a backup for the first datacenter storing an identical copy of data stored on the first datacenter;
receiving, at the first datacenter, a query for monitoring information associated with at least one service running on the first datacenter or the second datacenter within a database; and
parsing the query to identify filter information associated with the query, the filter information identifying which of the first datacenter or the second datacenter the requested service is running on.

8. A system of claim 7, wherein the operations further comprise:
querying the at least one view to request, by a server within the first datacenter, the monitoring information from the server on the first datacenter running the requested service.

9. A system of claim 7, wherein the operations further comprise:
querying the at least one proxy view to request, by a server within the first datacenter, the monitoring information from the server on the second datacenter running the requested service; and
receiving the monitoring information of the second datacenter at the first datacenter.

10. The system of claim 7, wherein the operations further comprise providing alerting based at least in part on the union view.

11. The system of claim 7, wherein the operations further comprise:
monitoring the connection status between the first datacenter and the second datacenter; and
skipping the at least one proxy view upon detection that the second datacenter is no longer connected to the first datacenter.

12. The system of claim 7, wherein a server capable of secure communications with remote datacenters within the first datacenter communicates with a server capable of secure communications with remote datacenters within the second datacenter to obtain the monitoring information from the server on the second datacenter running the requested service.

13. A non-transitory computer readable medium comprising computer program instructions adapted to cause a processing system to execute operations comprising:
providing, at a first datacenter, at least one view for monitoring information associated with the first datacenter, and at least one proxy view for monitoring information associated with a second datacenter, the second datacenter being a backup for the first datacenter storing an identical copy of data stored on the first datacenter;

receiving, at the first datacenter, a query for monitoring information associated with at least one service running on the first datacenter or the second datacenter within a database; and parsing, at the first datacenter, the query to identify filter information associated with the query, the filter information identifying which of the first datacenter or the second datacenter the requested service is running on.

14. A non-transitory computer readable medium as in claim 13, wherein the operations further comprise:

querying the at least one view to request, by a server within the first datacenter, the monitoring information from the server on the first datacenter running the requested service.

15. A non-transitory computer readable medium as in claim 13, wherein the operations further comprise:

querying the at least one proxy view to request, by a server within the first datacenter, the monitoring information from the server on the second datacenter running the requested service; and receiving, at the first datacenter, the monitoring information from the second datacenter.

16. A non-transitory computer readable medium as in claim 15 wherein a server capable of secure communications with remote datacenters within the first datacenter communicates with a server capable of secure communications with remote datacenters within the second datacenter to obtain the monitoring information from the server on the second datacenter running the requested service.

17. A non-transitory computer readable medium as in claim 13, wherein the operations further comprise:

providing alerting based at least in part on the at least one view and the at least one proxy view.

18. A non-transitory computer readable medium as in claim 13, wherein the operations further comprise:

monitoring the connection status between the first datacenter and the second datacenter; and skipping the at least one proxy view upon detection that the second datacenter is no longer connected to the first datacenter.

* * * * *